United States Patent
Fujishima et al.

(10) Patent No.: US 6,917,418 B2
(45) Date of Patent: Jul. 12, 2005

(54) ACCURACY ANALYZING APPARATUS FOR MACHINE TOOL

(75) Inventors: Makoto Fujishima, Yamatokoriyama (JP); Masao Kanamoto, Yamatokoriyama (JP)

(73) Assignees: Mori Seiki Co., Ltd., Yamatokoriyama (JP); Intelligent Manufacturing Systems International, Sacramento, CA (US)

(*) Notice: Subject to any disclaimer, the term of this patent is extended or adjusted under 35 U.S.C. 154(b) by 300 days.

(21) Appl. No.: 10/395,203

(22) Filed: Mar. 25, 2003

(65) Prior Publication Data

US 2003/0184768 A1 Oct. 2, 2003

(30) Foreign Application Priority Data

Mar. 27, 2002 (JP) .......................... 2002-088025

(51) Int. Cl.[7] .............................. G01B 11/26
(52) U.S. Cl. ................. 356/153; 356/141.3; 356/141.5; 356/400
(58) Field of Search ................. 356/399, 400, 356/138, 141.3, 141.5, 153, 154

(56) References Cited

U.S. PATENT DOCUMENTS

| | | | | |
|---|---|---|---|---|
| 4,277,169 A | * | 7/1981 | Krieg ....................... | 356/141.3 |
| 4,928,019 A | * | 5/1990 | Tomikawa et al. .......... | 356/400 |
| 5,045,678 A | * | 9/1991 | Esser et al. ................. | 356/400 |
| 5,148,232 A | * | 9/1992 | Duey et al. ............... | 356/141.3 |
| 5,224,052 A | * | 6/1993 | Hamar ....................... | 356/400 |
| 5,592,285 A | * | 1/1997 | Pund .......................... | 356/400 |
| 6,424,412 B1 | * | 7/2002 | Matthews .................. | 356/153 |
| 6,839,975 B2 | * | 1/2005 | Fujishima .................. | 33/502 |

FOREIGN PATENT DOCUMENTS

| | | |
|---|---|---|
| DE | 299 13 445 | 2/2001 |
| JP | 04-207368 | 7/1992 |
| JP | 08-321461 | 12/1996 |

\* cited by examiner

*Primary Examiner*—Richard A. Rosenberger
(74) *Attorney, Agent, or Firm*—Westerman, Hattori, Daniels & Adrian, LLP (57) ABSTRACT

An accuracy analyzing apparatus 1 comprises: a light projector 2 attached to a main spindle 26 for emitting a light beam having a light axis coaxial with the axis of the main spindle 26; a semitransparent mirror 3 which transmits part of the emitted light beam and reflects other part; a first imaging device 4a for receiving the transmitted light beam; a second imaging device 4b for receiving the reflected light beam; and an analyzer 10 which calculates light receiving positions in the first and second imaging devices 4a and 4b, which estimates the light receiving position where the reflected light beam is to be received by the second imaging device 4b in the case where it is assumed that the axis of the main spindle 26 coincides with the first axis, and which compares the estimated light receiving position with the calculated light receiving position to analyze the perpendicularity of the axis of the main spindle 26.

7 Claims, 7 Drawing Sheets

| LIGHT RECEIVING POSITION IN FIRST CCD CAMERA IN X-DIRECTION | | | | | | |
|---|---|---|---|---|---|---|
| | $X_{a1}$ | $X_{a2}$ | $X_{a3}$ | $X_{a4}$ | $X_{a5}$ | ... |
| $Y_{a1}$ | $X_{b1}, Z_{b1}$ | $X_{b2}, Z_{b1}$ | $X_{b3}, Z_{b1}$ | $X_{b4}, Z_{b1}$ | $X_{b5}, Z_{b1}$ | ... |
| $Y_{a2}$ | $X_{b1}, Z_{b2}$ | $X_{b2}, Z_{b2}$ | $X_{b3}, Z_{b2}$ | $X_{b4}, Z_{b2}$ | $X_{b5}, Z_{b2}$ | ... |
| $Y_{a3}$ | $X_{b1}, Z_{b3}$ | $X_{b2}, Z_{b3}$ | $X_{b3}, Z_{b3}$ | $X_{b4}, Z_{b3}$ | $X_{b5}, Z_{b3}$ | ... |
| $Y_{a4}$ | $X_{b1}, Z_{b4}$ | $X_{b2}, Z_{b4}$ | $X_{b3}, Z_{b4}$ | $X_{b4}, Z_{b4}$ | $X_{b5}, Z_{b4}$ | ... |
| $Y_{a5}$ | $X_{b1}, Z_{b5}$ | $X_{b2}, Z_{b5}$ | $X_{b3}, Z_{b5}$ | $X_{b4}, Z_{b5}$ | $X_{b5}, Z_{b5}$ | ... |
| ... | ... | ... | ... | ... | ... | ... |

LIGHT RECEIVING POSITION IN FIRST CCD CAMERA IN Y-DIRECTION

ACCURACY ANALYZING APPARATUS FOR MACHINE TOOL

BACKGROUND OF THE INVENTION

1. Field of the Invention

The present invention relates to an accuracy analyzing apparatus for a machine tool in which a table and a main spindle are relatively moved in three orthogonal axial directions of a first axis that elongates along the axis of the main spindle, and second and third axes that are perpendicular to each other, and also to the first axis. Such an accuracy analyzing apparatus is used for analyzing the perpendicularity of the axis of the main spindle with respect to a plane defined by the second and third axes.

2. Description of the Prior Art

The perpendicularity of the axis of the main spindle directly affects the machining accuracy. Before shipment from the manufacturer of the machine tool to the user, therefore, the perpendicularity is usually checked and adjusted so as to attain a predetermined reference value.

Figure 7:
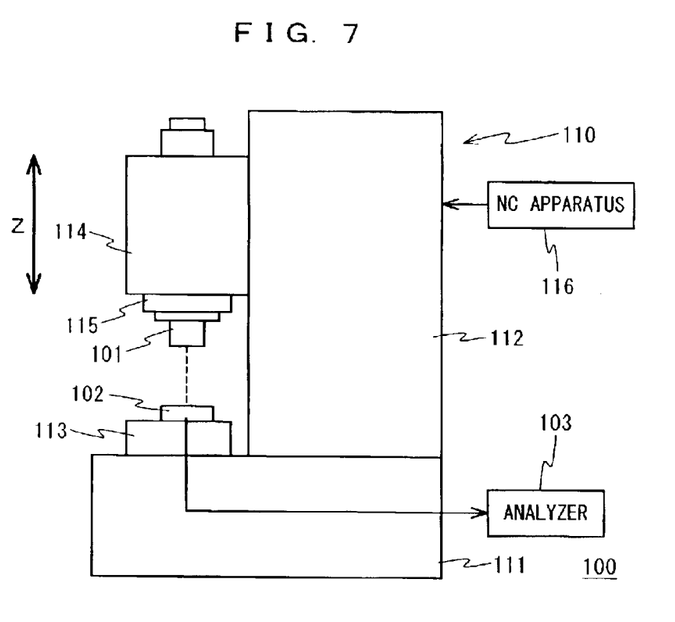
FIG. 7 is a block diagram schematically showing the configuration of an accuracy analyzing apparatus of the conventional art.

As an apparatus for checking the perpendicularity, the inventor of the present invention has proposed an accuracy analyzing apparatus shown in FIG. 7. As shown in FIG. 7, the accuracy analyzing apparatus 100 comprises: a laser oscillator 101 attached to a main spindle 115 of a machine tool 110; a CCD camera 102 which is placed and fixed onto a table 113 so as to be opposed to the laser oscillator 101; an analyzer 103 which analyzes the accuracy of the machine tool 110 on the basis of an image picked up by the CCD camera 102; and an outputting device (not shown) which displays or prints out a result of the analysis performed by the analyzer 103.

For example, the machine tool 110 has the structure configured by: a bed 111; a column 112 which is fixed onto the bed 111; a table 113 which is placed on the bed 111, and which is movable in a horizontal plane and two orthogonal axial directions (X- and Y-axis directions); a spindle head 114 which is supported by the column 112 so as to be movable in the vertical direction (Z-axis direction), and which supports the main spindle 115 so that the main spindle 115 is rotatable about an axis thereof; a first feed mechanism (not shown) which moves the spindle head 114 in the Z-axis direction; a second feed mechanism (not shown) which moves the table 113 in the Y-axis direction; a third feed mechanism (not shown) which moves the table 113 in the X-axis direction; and an NC apparatus 116 which controls the operations of the first feed mechanism, the second feed mechanism, and the third feed mechanism, and the like.

The laser oscillator 101 emits laser beam, and as described above is attached to the main spindle 115 and set so that the light axis of the laser beam is coaxial with the axis of the main spindle 115. The CCD camera 102 comprises as imaging elements a plurality of photoelectric conversion elements which are two-dimensionally arranged in a multi-row, multi-column array. The CCD camera 102 digitizes voltage signals which are output from the photoelectric conversion elements in accordance with the amount of received light, converts the digitized signals into density level values, and outputs the values as two-dimensional density image data which are arranged in the same manner as the arrangement of the photoelectric conversion elements.

The analyzer 103 binarizes by a predetermined threshold the two-dimensional density image data which are output from the CCD camera 102, to extract an image corresponding to the laser beam, and analyzes the extracted binary image to analyze the accuracy of the machine tool 110.

Figure 8:
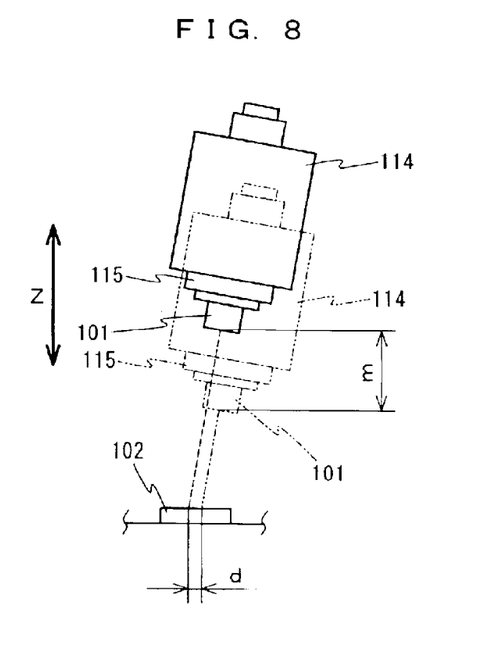
FIG. 8 is an explanatory diagram illustrating a process of analyzing the perpendicularity of the axis of a main spindle in the conventional apparatus.

For example, the axis of the main spindle 115 will be considered. In the case where the axis of the main spindle 115 is inclined with respect to the Z-axis as shown in FIG. 8, when the spindle head 114 is moved in the Z-axis direction by the first feed mechanism (not shown), a deviation is caused between the center position of the binary image which is extracted before the movement, and that of the binary image which is extracted after the movement. On the basis of the binary images which are obtained before and after the movement, for example, the analyzer 103 calculates the deviation amount d of the center position, and, based on the calculated deviation amount d and the movement distance m in the Z-axis direction, calculates the inclination angle of the axis of the main spindle 115 with respect to the Z-axis to analyze the perpendicularity of the axis of the main spindle 115 with respect to the horizontal plane (a plane defined by the X- and Y-axes).

The accuracy analyzing apparatus 100 can precisely analyze the accuracy of the machine tool 110 or the perpendicularity of the axis of the main spindle 115. In the accuracy analyzing apparatus 100, however, the accuracy analyzation requires the cumbersome work of operating the first feed mechanism (not shown) to move the spindle head 114 in the Z-axis direction, and hence is not always efficient. Accordingly, a need remains for an improved accuracy analyzing apparatus. Moreover, there is the possibility that the accuracy analyzing apparatus 100 is damaged by an erroneous operation during the movement of the spindle head 114.

The invention has been conducted in order to achieve the improvement. It is an object of the invention to provide an accuracy analyzing apparatus in which the perpendicularity of the axis of a main spindle can be efficiently analyzed by a simple operation.

SUMMARY OF THE INVENTION

In order to attain the object, the invention provides an accuracy analyzing apparatus for a machine tool comprising a table, a main spindle and a feed mechanism for relatively moving the table and the main spindle along orthogonal three axes including a first axis extending along a main spindle axis and second and third axes perpendicular to each other and perpendicular to the first axis, the accuracy analyzing apparatus comprises:

light projecting means attached to the main spindle for emitting a light beam having a light axis coaxial with the main spindle axis;

first imaging means including an image pickup surface having a two-dimensional planar shape and placed below the light projecting means and being perpendicular to the first axis and being parallel to the second and third axes, for receiving the light beam emitted from the light projecting means by the image pickup surface and generating two-dimensional image data of the light beam;

a semitransparent mirror which has a plate-like shape, which is placed between the light projecting means and the first imaging means while a plate planar face of the mirror is inclined with respect to the first and second axes and parallel to the third axis, and which transmits part of the light beam emitted from the light projecting means in an emission direction, and reflects other part of the light beam;

second imaging means including an image pickup surface having a two-dimensional planar shape and placed at an opposite position to the semitransparent mirror and being parallel to the first and third axes and being perpendicular to the second axis, for receiving the reflected light beam from the semitransparent mirror by the image pickup surface and generating two-dimensional image data of the reflected light beam; and analyzing means for:

receiving the two-dimensional image data generated by the first and second imaging means;

calculating light receiving positions in the image pickup surfaces of the first and second imaging means on the basis of the received two-dimensional image data;

estimating a light receiving position in the image pickup surface of the second imaging means where the light beam reflected by the semitransparent mirror is to be received by the image pickup surface of the second imaging means in the case where it is assumed that the axis of the main spindle coincides with the first axis, on the basis of the calculated light receiving position in the image pickup surface of the first imaging means; and comparing the estimated light receiving position with the calculated light receiving position in the image pickup surface of the second imaging means and analyzing perpendicularity of the axis of the main spindle with respect to a plane defined by the second and third axes.

According to the invention, first, the light projecting means is attached to the main spindle of the machine tool, and then emits light beam in which the light axis is coaxial with the axis of the main spindle. Part of the emitted light beam is transmitted through the semitransparent mirror in the emission direction to be received by the first imaging means, and other part is reflected by the mirror to be received by the second imaging means.

Preferably, the light projecting means is configured by a laser oscillator which emits laser beam, because emitted laser beam has excellent linearity and convergence.

A preferred specific example of the first and second imaging means is a CCD camera. A CCD camera comprises a plurality of photoelectric conversion elements which are two-dimensionally arranged in a multi-row, multi-column array, digitizes voltage signals which are output from the photoelectric conversion elements in accordance with the amount of received light, converts the digitized signals into density level values, and outputs the values as two-dimensional density image data which are arranged in the same manner as the arrangement of the photoelectric conversion elements. The light beam emitted from the light projecting means has a substantially circular sectional shape. In two-dimensional density images which are obtained by the first and second imaging means, therefore, a portion of a low density level has a substantially circular shape.

In the case where the axis of the main spindle is inclined with respect to the first axis, or the case where the axis of the main spindle is not perpendicular to the plane defined by the second and third axes, even when the light receiving position where the light beam which is emitted from light projecting means to the semitransparent mirror and transmitted therethrough is received by the first imaging means coincides with that where, when the axis of the main spindle coincides with the first axis, the light beam is similarly received by the first imaging means, the emitted light beam impinges on different positions of the semitransparent mirror. Therefore, the light receiving position where the reflected light beam from the semitransparent mirror is received by the second imaging means in the case where the axis of the main spindle is inclined with respect to the first axis is naturally different from that in the case where the axis of the main spindle coincides with the first axis.

In the invention, consequently, the analyzing means calculates light receiving positions in the image pickup surfaces of the first and second imaging means, on the basis of the two-dimensional image data received from the first and second imaging means. On the basis of the calculated light receiving position in the image pickup surface of the first imaging means, the analyzing means estimates the light receiving position in the image pickup surface of the second imaging means where the light beam reflected by the semitransparent mirror is to be received by the image pickup surface of the second imaging means in the case where it is assumed that the axis of the main spindle coincides with the first axis. The analyzing means compares the estimated light receiving position with the calculated light receiving position in the image pickup surface of the second imaging means, and analyzes and evaluates the perpendicularity of the axis of the main spindle with respect to the plane defined by the second and third axes.

The evaluation may be performed in the following manner. The inclination angle of the axis of the main spindle is calculated, or the difference between the estimated light receiving position and the calculated light receiving position in the second imaging means is calculated. The calculated difference is compared with a preset reference value. If the difference is larger than the reference value, it is determined that the perpendicularity is not satisfactory.

In this way, according to the accuracy analyzing apparatus of the invention, it is possible to analyze and evaluate the perpendicularity of the axis of the main spindle without requiring a cumbersome work, and in a state where the machine tool is in a stationary state. In this viewpoint, therefore, the analyzing work can be efficiently performed. Since the machine tool is stationary, the accuracy analyzing apparatus is free from danger of being damaged.

The estimation of the light receiving position may be performed in the following manner. First, positional relationships in the case where the axis of the main spindle coincides with the first axis, between: the light receiving position where the light beam which is emitted from the light projecting means and transmitted through the semitransparent mirror is received by the image pickup surface of the first imaging means; and the light receiving position where the light beam which is emitted from the light projecting means and reflected by the semitransparent mirror is received by the image pickup surface of the second imaging means are stored as a data table into data storing means. The analyzing means searches data stored in the data storing means on the basis of the calculated light receiving position in the first imaging means, reads out the light receiving position of the second imaging means corresponding to the calculated light receiving position, and sets the read out light receiving position of the second imaging means, as the estimated light receiving position of the second imaging means.

Alternatively, the analyzing means may calculate the estimated light receiving position in the second imaging means, on the basis of: the calculated light receiving position in the first imaging means; and a calculation expression which is set from relative positional relationships among the first imaging means, the second imaging means, and the semitransparent mirror, and an inclination angle of the semitransparent mirror.

The first imaging means, the second imaging means, and the semitransparent mirror may be moved by a transferring device between a light receiving position where the light beam emitted from the light projecting means is received, and a stand-by position separated from the light receiving position. According to the configuration, during a working process of the machine tool, the first imaging means, the second imaging means, and the semitransparent mirror can be adequately set to a stand-by state, and, when they are required to perform the accuracy analyzation, they can be placed at the light receiving position (analyzing position). Therefore, the analyzation can be performed as needed. As a result, appropriate measures corresponding to an analyzation result can be taken arbitrarily, and hence the machine tool can be maintained to a satisfactory condition for a long time.

DESCRIPTION OF THE PREFERRED EMBODIMENT

Figure 1:
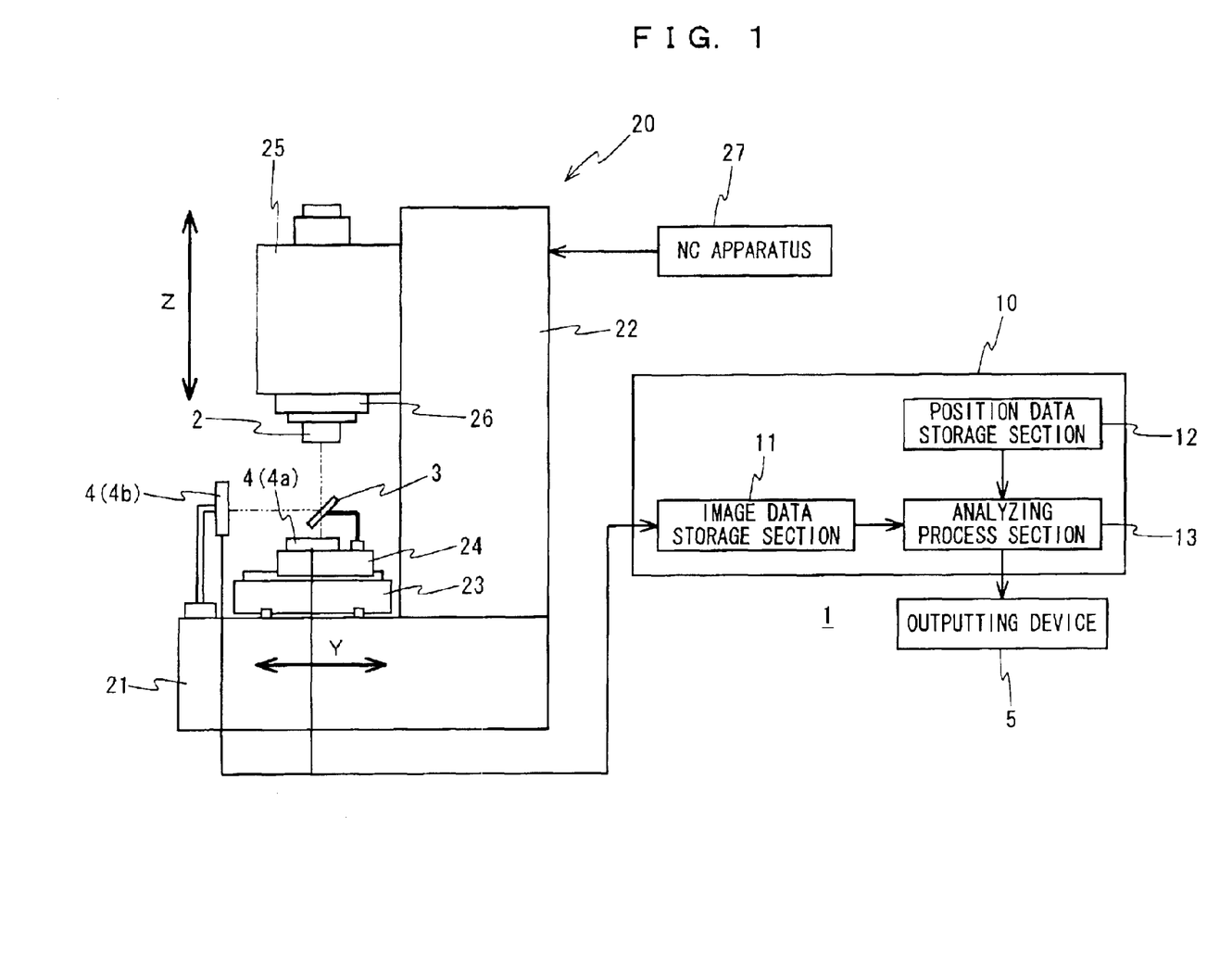
FIG. 1 is a block diagram schematically showing the configuration of an accuracy analyzing apparatus of an embodiment of the invention.

Hereinafter, a preferred embodiment of the invention will be described with reference to the accompanying drawings. FIG. 1 is a block diagram schematically showing the configuration of an accuracy analyzing apparatus of an embodiment of the invention.

As shown in FIG. 1, the accuracy analyzing apparatus 1 of the embodiment comprises: a laser oscillator 2 attached to a main spindle 26 of a machine tool 20; a semitransparent mirror 3 which transmits part of laser beam emitted from the laser oscillator 2 in the emission direction, and reflects other part of the laser beam; a light receiving device 4 which receives the laser beam that is emitted from the laser oscillator 2 and then transmitted through or reflected by the semitransparent mirror 3; an analyzer 10 which analyzes the perpendicularity of the axis of the main spindle 26 on the basis of an image picked up by the light receiving device 4; and an outputting device 5 which is configured by a CRT, a printer, or the like, and which displays or prints out a result of the analysis performed by the analyzer 10.

In the embodiment, the machine tool 20 is a so-called vertical machining center, and mainly comprises: a bed 21; a column 22 which is fixed onto the bed 21; a spindle head 25 which is supported by the column 22 so as to be movable in the vertical direction (the direction of the arrow or the Z-axis (first axis)), and which supports the main spindle 26 so that the main spindle 26 is rotatable about an axis thereof; a saddle 23 which is placed on the bed 21 so as to be movable in a horizontal plane in the direction of the arrow or the X-axis (third axis); a table 24 which is placed on the saddle 23 so as to be movable in a horizontal plane in the direction of the arrow or the Y-axis (second axis) that is perpendicular to the X-axis; a first feed mechanism (not shown) which moves the spindle head 25 in the Z-axis direction; a second feed mechanism (not shown) which moves the table 24 in the Y-axis direction; a third feed mechanism (not shown) which moves the saddle 23 in the X-axis direction; and an NC apparatus 27 which controls the operations of the first feed mechanism, the second feed mechanism, and the third feed mechanism, and the like.

The laser oscillator 2 emits laser beam, and as described above is attached to the main spindle 26 and set so that the light axis of the laser beam is coaxial with the axis of the main spindle 26. The laser beam is advantageous in terms of linearity of the light axis and the convergence of the light beam.

The semitransparent mirror 3 is disposed below the laser oscillator 2, and placed so that its light receiving face is inclined by a predetermined angle with respect to the Z- and Y-axes, and parallel to the X-axis.

The light receiving device 4 is configured by a first CCD camera 4a and a second CCD camera 4b. Each of the first and second CCD cameras 4a and 4b comprises a plurality of photoelectric conversion elements which are two-dimensionally arranged in a multi-row, multi-column array, digitizes voltage signals which are output from the photoelectric conversion elements in accordance with the amount of received light, converts the digitized signals into density level values, and outputs the values as two-dimensional density image data which are arranged in the same manner as the arrangement of the photoelectric conversion elements.

The first CCD camera 4a is placed and fixed onto the table 24 below the semitransparent mirror 3 so as to be parallel to the X- and Y-axes and perpendicular to the Z-axis, and opposed to the laser oscillator 2, and receives laser beam which is transmitted through the semitransparent mirror 3. The second CCD camera 4b is disposed on the bed 21 so as to be perpendicular to the first CCD camera 4a, or parallel to the X- and Z-axes and perpendicular to the Y-axis, and receives laser beam which is reflected by the semitransparent mirror 3.

Figure 4:
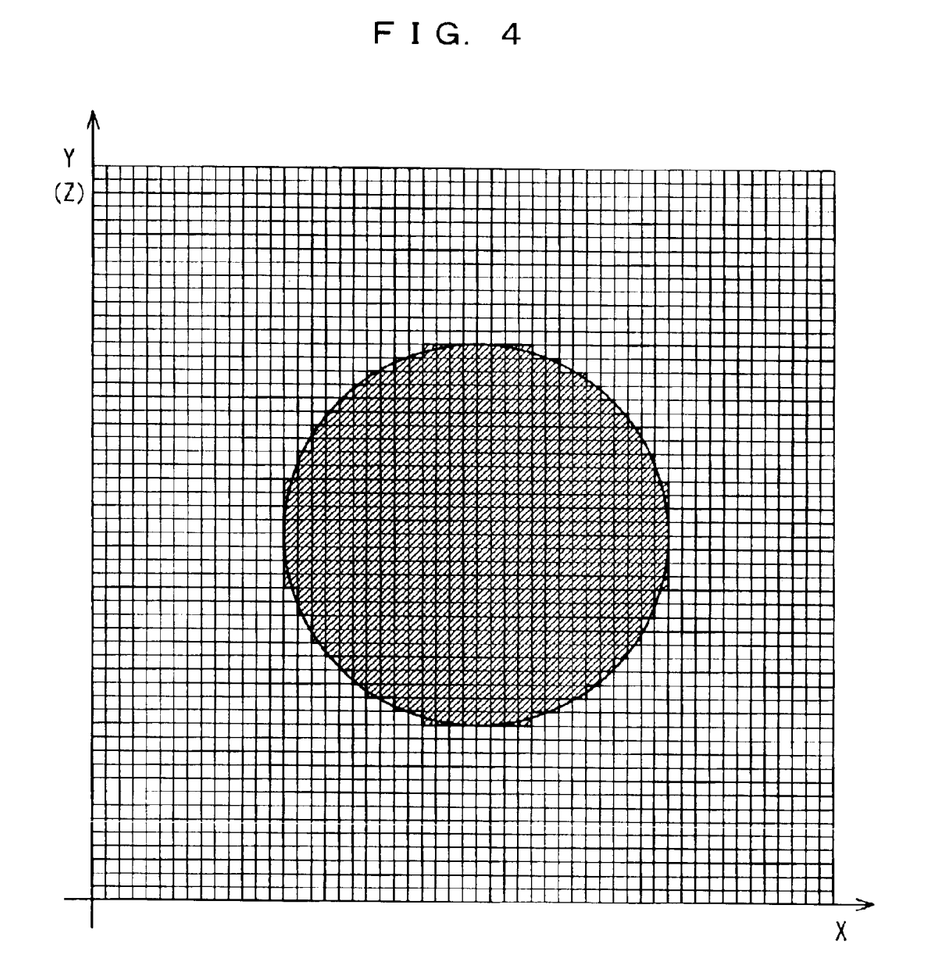
FIG. 4 is an explanatory diagram illustrating a procedure of calculating the center position of laser beam.

The laser beam emitted from the laser oscillator 2 has a substantially circular sectional shape. In two-dimensional density images which are obtained by the first and second CCD cameras 4a and 4b, therefore, a portion of a low density level has a substantially circular shape. FIG. 4 shows an example of such a density image. In FIG. 4, each of the square in the grid indicates one of pixels respectively corresponding to the photoelectric conversion elements, and the circle indicated by the thick continuous line corresponds to the outer periphery of the laser beam. The hatched pixel portion has a low density level, and configures an image of the laser beam. In FIG. 4, for the sake of convenience in description, the density levels are shown in an inverted manner.

Figure 2:
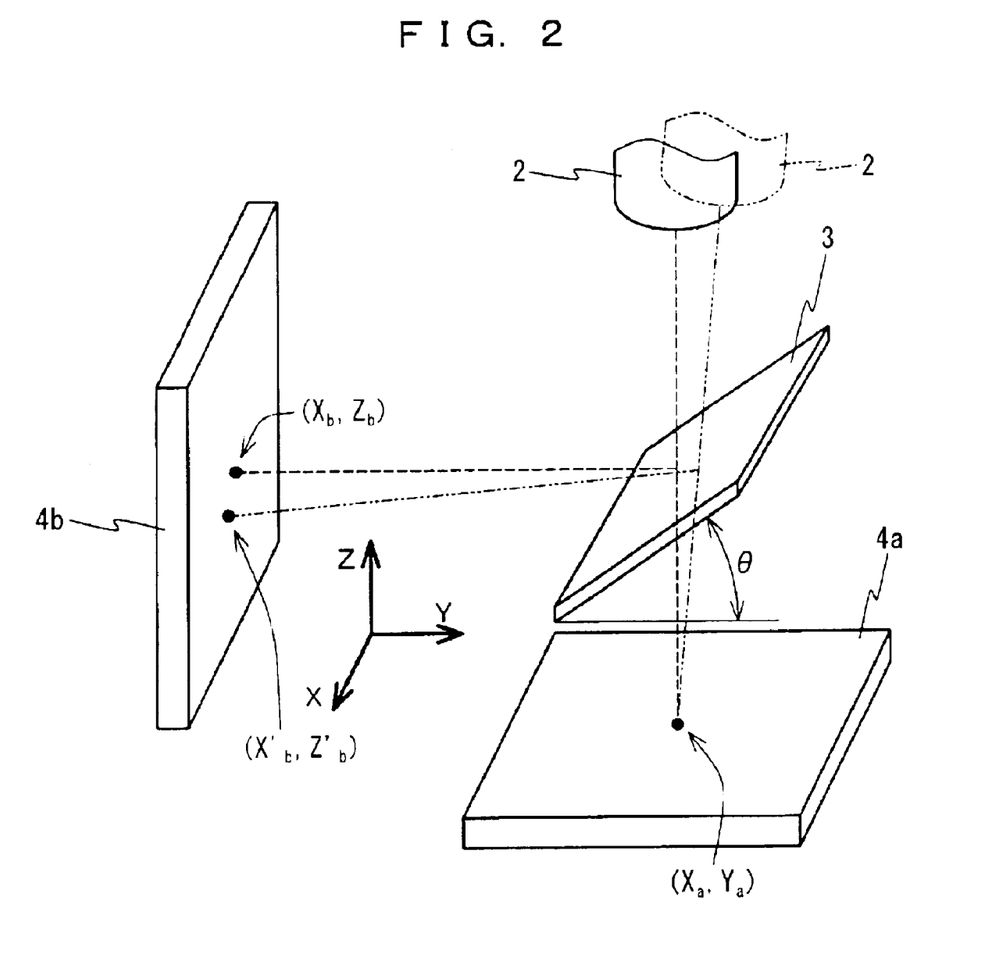
FIG. 2 is an explanatory diagram illustrating a relationship between a first CCD camera and a second CCD camera in the embodiment.

As shown in FIG. 2, in the case where the axis of the main spindle 26 is inclined with respect to the Z-axis serving as the first axis, or the case where the axis of the main spindle 26 is not perpendicular to the plane defined by the Y-axis serving as the second axis and the X-axis serving as the third axis, even when the light receiving position where the laser beam which is emitted from the laser oscillator 2 to the semitransparent mirror 3 and transmitted therethrough is received by the first CCD camera 4a coincides with that where, when the axis of the main spindle 26 coincides with the Z-axis, the laser beam is similarly received by the first CCD camera 4a, the emitted laser beam impinges on different positions of the semitransparent mirror 3. Therefore, the light receiving position where the reflected laser beam from the semitransparent mirror 3 is received by the second CCD camera 4b in the case where the axis of the main spindle 26 is inclined with respect to the Z-axis is naturally different from that in the case where the axis of the main spindle 26 coincides with the Z-axis.

In consideration of this phenomenon, the analyzer 10 in the embodiment calculates the light receiving positions in the first CCD camera 4a and the second CCD camera 4b, on the basis of the two-dimensional image data which are received from the first and second CCD cameras 4a and 4b. Furthermore, the analyzer estimates the light receiving position where the laser beam reflected by the semitransparent mirror 3 is to be received by the second CCD camera 4b in the case where it is assumed that the axis of the main spindle 26 coincides with the Z-axis, on the basis of the calculated light receiving positions in the first CCD camera 4a, compares the estimated light receiving position with the calculated light receiving position in the second CCD camera 4b, and analyzes and evaluates the perpendicularity of the axis of the main spindle 26.

Specifically, the analyzer 10 is configured by an image data storage section 11, a position data storage section 12, an analyzing process section 13, etc.

The image data storage section 11 stores the two-dimensional density image data which are output from the first CCD camera 4a and the second CCD camera 4b.

Figure 3:
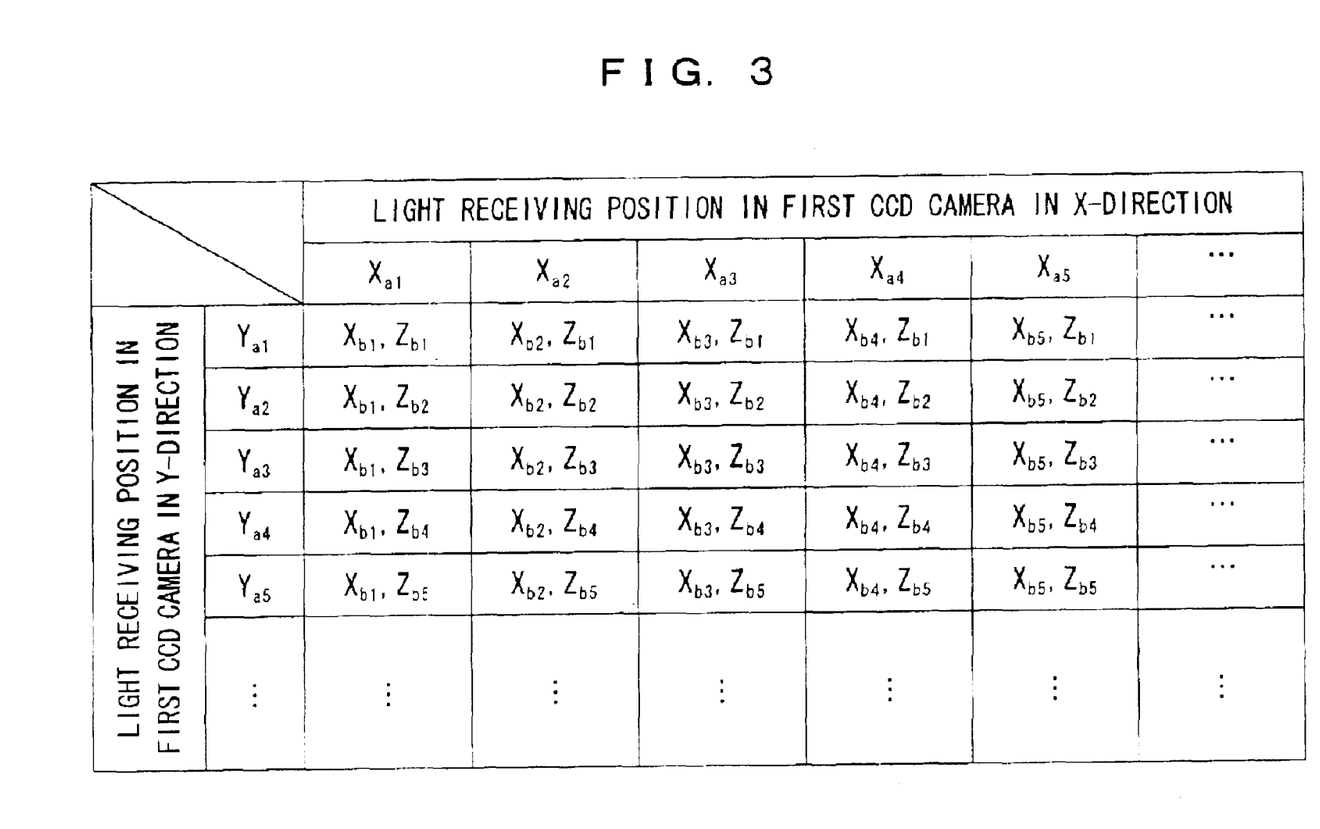
FIG. 3 is an explanatory diagram illustrating the configuration of data which are stored in a position data storage section in the embodiment.

The position data storage section 12 stores the center position (the light receiving position in the first CCD camera 4a) of the two-dimensional density image data which are obtained by the first CCD camera 4a in the case where the axis of the main spindle 26 coincides with the Z-axis, and the center position (the light receiving position in the second CCD camera 4b) of the two-dimensional density image data which are obtained by the second CCD camera 4b such as a data table shown in FIG. 3 and in a previously correlated manner. The data can be obtained by actual measurement, or calculated by using a theoretical expression.

In the case where the data are to be obtained by actual measurement, the table 24 is moved at a predetermined pitch in the X-axis direction and the Y-axis direction in the state where the axis of the main spindle 26 coincides with the Z-axis, and images of the transmitted laser beam and the reflected laser beam are picked up by the first CCD camera 4a and the second CCD camera 4b, respectively.

Figure 5:
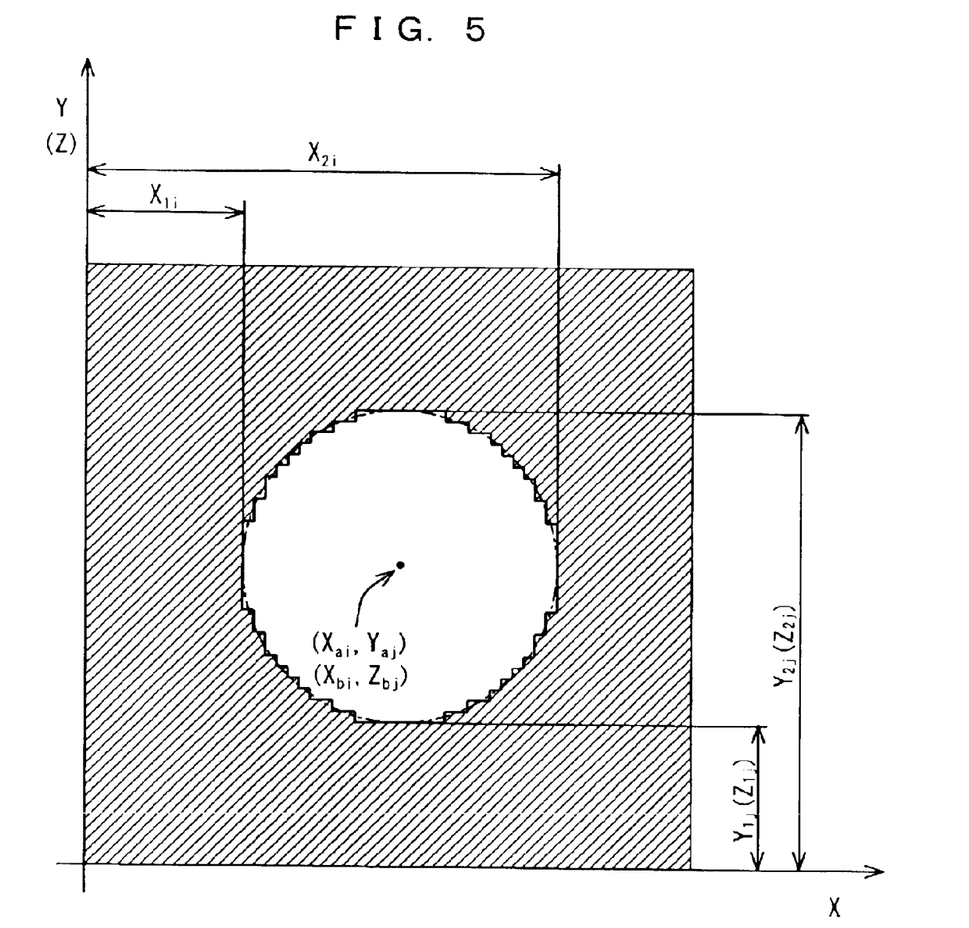
FIG. 5 is an explanatory diagram illustrating the procedure of calculating the center position of laser beam.

The obtained two-dimensional density image data are binarized by a predetermined threshold, whereby binary images corresponding to the laser beam are extracted. As an example of the binary images, FIG. 5 shows an image which is obtained by binarizing the density image of FIG. 4. In FIG. 5, the grid indicating the pixels is not shown, and the hatched pixel portion is black. The circle indicated by the chain double-dashed line corresponds to the outer periphery of the laser beam.

The binary images are then scanned in the raster direction, so that, for the binary image obtained by the first CCD camera 4a, the boundary positions of white pixels (white image) in the X-direction (the direction along the X-axis direction) and the Y-direction (the direction along the Y-axis direction) are detected, and, for the binary image obtained by the second CCD camera 4b, the boundary positions of white pixels (white image) in the X- and Z-directions are detected. From the values of the detected boundary positions, the center coordinates (positions) $(X_{ai}, Y_{aj})$ and $(X_{bi}, Z_{bj})$ of the white images are calculated.

Assuming that the boundary positions in the X-direction are $X_{1i}$ and $X_{2i}$, those in the Y-direction are $Y_{1j}$ and $Y_{2j}$, and those in the Z-direction are $Z_{1j}$ and $Z_{2j}$, the center coordinates $(X_{ai}, Y_{aj})$ and $(X_{bi}, Z_{bj})$ are as follows.

$$X_{ai}=(X_{1i}+X_{2i})/2$$

$$Y_{aj}=(Y_{1j}+Y_{2j})/2$$

$$X_{bi}=(X_{1i}+X_{2i})/2$$

$$Z_{bj}=(Z_{1j}+Z_{2j})/2$$

where i=1 to n (n is an integer) and j=1 to m (m is an integer).

With respect to the first CCD camera 4a and the second CCD camera 4b, preferably, the positions of the cameras in the X-direction are accurately positioned, or the pixel positions in the X-direction are correctly calibrated on the basis of the center coordinates $(X_{a1}, Y_{a1})$ and $(X_{b1}, Z_{b1})$ which are initially calculated, or the positions are calibrated so that $X_{a1}=X_{b1}$ is attained, and the subsequent center coordinates $(X_{ai}, Y_{aj})$ and $(X_{bi}, Z_{bj})$ are actually measured while considering a result of the calibration.

In this way, at each of movement positions of the table 24, the light receiving position of the first CCD camera 4a and that of the second CCD camera 4b are calculated, and the calculated positions are stored into the position data storage section 12 in a correlated manner.

Figure 6:
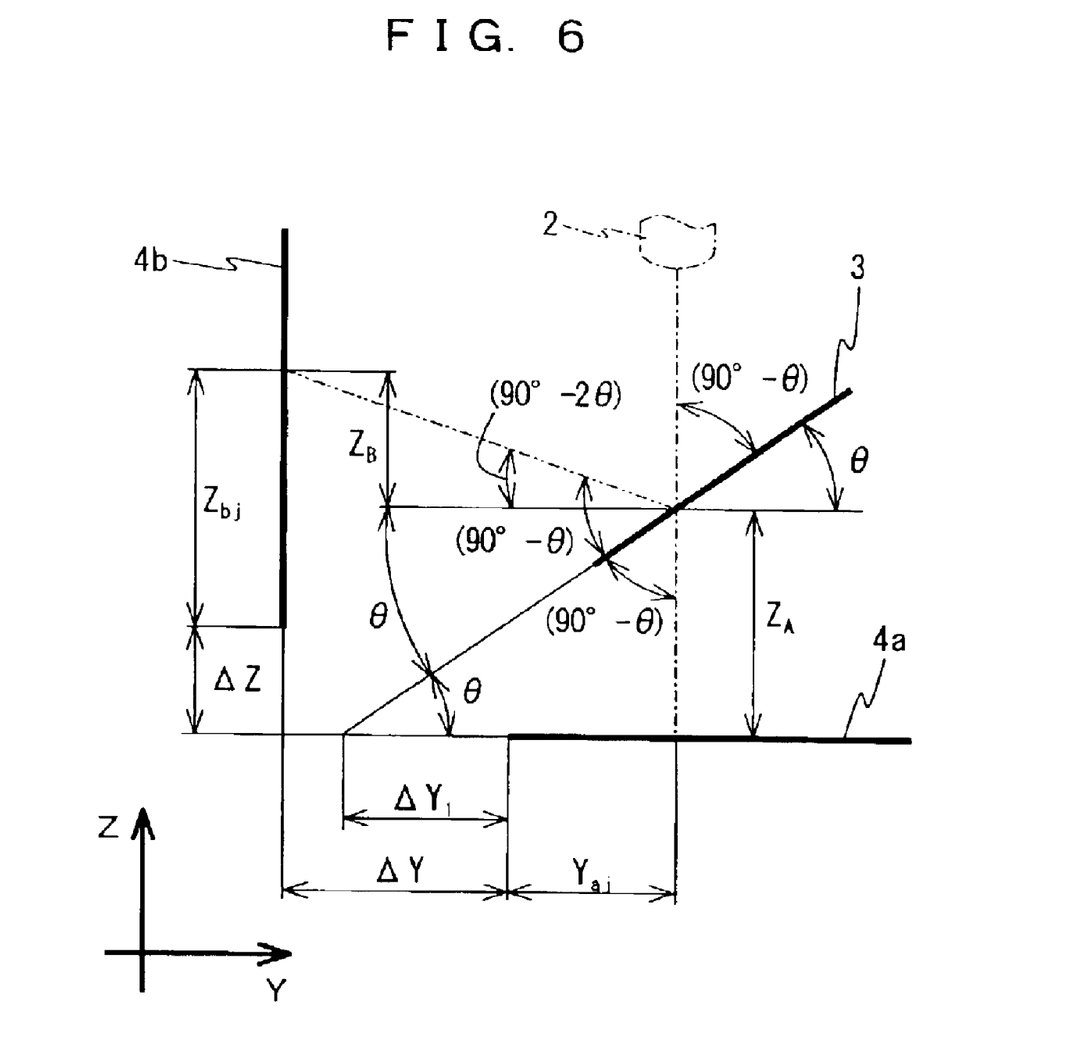
FIG. 6 is an explanatory diagram illustrating a process in an analyzing process section in the embodiment.

By contrast, in the case where the positions are to be calculated by using a theoretical expression, the center positions are obtained in the following manner. Light receiving positions $(X_{bi}, Z_{bj})$ of the second CCD camera 4b with respect to the light receiving positions $(X_{ai}, Y_{aj})$ of the first CCD camera 4a are calculated by using the following expression which is obtained from geometrical relative positional relationships ($\Delta Z$, $\Delta Y$, $\Delta Y_1$) among the first CCD camera 4a, the second CCD camera 4b, and the semitransparent mirror 3, and the inclination angle (θ) of the semitransparent mirror 3 such as shown in FIG. 6. The calculated light receiving positions are stored into the position data storage section 12 in a correlated manner. In this case also, the relative positions of the first and second CCD cameras 4a and 4b in the X-direction must be accurately positioned. Since the semitransparent mirror 3 is disposed in parallel to the X-axis, the estimated light receiving positions $(X_{bi})$ of the second CCD camera 4b with respect to the light receiving positions $(X_{ai})$ of the first CCD camera 4a in the X-direction are identical.

$$Z_{aj} = Z_A + Z_B - \Delta Z$$
$$= ((\Delta Y_1 + Y_{aj}) \cdot \tan\theta) + ((\Delta Y + Y_{aj}) \cdot \tan(90° - 2\theta)) - \Delta Z$$

The terms $Z_A$ and $Z_B$ in the above expression are indicated by the following expressions.

$$Z_A=(\Delta Y_1+Y_{aj})\cdot\tan\theta, \text{ and}$$

$$Z_B=(\Delta Y+Y_{aj})\cdot\tan(90°-2\theta)$$

The analyzing process section 13 first reads out the two-dimensional density image data which are picked up by the first and second CCD cameras 4a and 4b and stored in the image data storage section 11, and then binarizes the data by a predetermined threshold in the same manner as described above, to extract a binary image corresponding to the laser beam. From the binary images which are picked up by the first and second CCD cameras 4a and 4b, the analyzing process section 13 calculates the center positions of the binary images, i.e., the light receiving positions ($X_a$, $Y_a$) and ($X_b$, $Z_b$).

The analyzing process section 13 then searches the data table stored in the position data storage section 12 on the basis of the calculated light receiving position ($X_a$, $Y_a$) of the first CCD camera 4a, to read out the light receiving position ($X_{bi}$, $Z_{bj}$) of the second CCD camera 4b corresponding to the calculated light receiving position ($X_a$, $Y_a$), and sets the read out light receiving position as an estimated light receiving position ($X'_b$, $Z'_b$).

The estimated light receiving position ($X'_b$, $Z'_b$) is a position where, in the case where it is assumed that the axis of the main spindle 26 coincides with the Z-axis, the laser beam reflected by the semitransparent mirror 3 is estimated to be received by the second CCD camera 4b.

Thereafter, the analyzing process section 13 calculates the difference between the calculated light receiving position ($X_b$, $Z_b$) of the second CCD camera 4b and the estimated light receiving position ($X'_b$, $Z'_b$). If the calculated difference is larger than a preset reference value, it is determined that the perpendicularity of the axis of the main spindle 26 is not satisfactory, and, if the calculated difference is not larger than the reference value, it is determined that the perpendicularity is satisfactory.

The result which has been determined in this way is outputted to the outputting device 5.

As described above, in the thus configured accuracy analyzing apparatus 1 of the embodiment, first, the laser oscillator 2 attached to the main spindle 26 emits laser beam toward the semitransparent mirror 3, part of the emitted laser beam is transmitted through the semitransparent mirror 3 in the emission direction to be received by the first CCD camera 4a, other part of the laser beam is reflected by the semitransparent mirror 3 to be received by the second CCD camera 4b, the first and second CCD cameras 4a and 4b pick up images of the transmitted laser beam and the reflected laser beam, respectively, and the picked up images are stored into the image data storage section 11.

In the analyzing process section 13, the two-dimensional density image data of the first and second CCD cameras 4a and 4b which are stored in the image data storage section 11 are read out, and then subjected to the binarizing process, and the light receiving positions ($X_a$, $Y_a$) and ($X_b$, $Z_b$) in the first and second CCD cameras 4a and 4b are then calculated.

Thereafter, the data stored in the position data storage section 12 are searched on the basis of the calculated light receiving position ($X_a$, $Y_a$) of the first CCD camera 4a, and the estimated light receiving position ($X'_b$, $Z'_b$) of the second CCD camera 4b corresponding to the calculated light receiving position ($X_a$, $Y_a$), i.e., a position where, in the case where it is assumed that the axis of the main spindle 26 coincides with the Z-axis, the laser beam reflected by the semitransparent mirror 3 is estimated to be received by the second CCD camera 4b is estimated. Then, the difference between the estimated light receiving position ($X'_b$, $Z'_b$) and the calculated light receiving position ($X_b$, $Z_b$) of the second CCD camera 4b is calculated. If the calculated difference is larger than the reference value, it is determined that the perpendicularity is not satisfactory, and, if the calculated difference is not larger than the reference value, it is determined that the perpendicularity is satisfactory.

As described above, according to the accuracy analyzing apparatus 1, it is possible to analyze and evaluate the perpendicularity of the main spindle 26 without requiring a cumbersome work, and in a state where the machine tool 20 is in a stationary state. In this viewpoint, therefore, the analyzing work can be efficiently performed. Since the machine tool 20 is stationary, the accuracy analyzing apparatus 1 is free from danger of being damaged.

As easily seen from FIGS. 2 and 6, even in the case where the axis of the main spindle 26 is inclined only by a small degree, when the second CCD camera 4b is placed so as to be remoter from the semitransparent mirror 3, the light receiving position where the reflected laser beam is received by the second CCD camera 4b is largely deviated from that where, in the case where the axis of the main spindle 26 coincides with the Z-axis, the reflected laser beam is received by the second CCD camera 4b. According to the accuracy analyzing apparatus 1 of the embodiment, when the position of the second CCD camera 4b with respect to the semitransparent mirror 3 is adequately set, therefore, the perpendicularity of the main spindle 26 can be detected more accurately.

In the above, an embodiment of the invention has been described above. It is a matter of course that specific modes in which the invention can be realized are not restricted to this.

In the embodiment, the estimated light receiving positions in each of which, in the case where it is assumed that the axis of the main spindle 26 coincides with the Z-axis, the laser beam reflected by the semitransparent mirror 3 is estimated to be received by the second CCD camera 4b are stored into the position data storage section 12 as a data table, and the analyzing process section 13 searches the position data storage section 12 on the basis of the light receiving position of the first CCD camera 4a which is actually received, to obtain an estimated light receiving position of the second CCD camera 4b which corresponds to the light receiving position. Alternatively, the position data storage section 12 may be omitted, and the analyzing process section 13 may directly calculate the estimated light receiving position ($X'_b$, $Z'_b$) of the second CCD camera 4b, from the light receiving position ($X_a$, $Y_a$) of the first CCD camera 4a where laser beam is actually received, in accordance with the following expressions.

$$X'_b = X_a,$$

$$Z'_b = ((\Delta Y_1 + Y_a) \cdot \tan\theta) + ((\Delta Y + Y_a) \cdot \tan(90° - 2\theta)) - \Delta Z$$

Alternatively, the laser oscillator 2 may be housed in a tool magazine and enabled to be periodically attached to the main spindle 26 by an automatic tool changer, and the semitransparent mirror 3 and the light receiving device 4 may be configured as a single structure which is placed in the vicinity of the table 24 and reciprocally moved to a position below the laser oscillator 2 by an adequate transferring device. According to the configuration, the perpendicularity of the axis of the main spindle 26 can be periodically checked, and, when the perpendicularity is lowered, adequate countermeasure such as repair can be appropriately taken, with the result that the machine tool 20 can be maintained to a satisfactory condition for a long time.

Although the embodiment is configured so as to analyze the accuracy of the vertical machining center 20, the invention can be similarly applied also to another machine tool such as a horizontal machining center or a lathe.

What is claimed is:

1. An accuracy analyzing apparatus for a machine tool comprising a table, a main spindle and a feed mechanism for relatively moving the table and the main spindle along orthogonal three axes including a first axis extending along a main spindle axis and second and third axes perpendicular to each other and perpendicular to the first axis, the accuracy analyzing apparatus comprises:

light projecting means attached to the main spindle for emitting a light beam having a light axis coaxial with the main spindle axis;

first imaging means including an image pickup surface having a two-dimensional planar shape and placed below the light projecting means and being perpendicular to the first axis and being parallel to the second and third axes, for receiving the light beam emitted from the light projecting means by the image pickup surface and generating two-dimensional image data of the light beam;

a semitransparent mirror which has a plate-like shape, which is placed between the light projecting means and the first imaging means while a plate planar face of the mirror is inclined with respect to the first and second axes and parallel to the third axis, and which transmits part of the light beam emitted from the light projecting means in an emission direction, and reflects other part of the light beam;

second imaging means including an image pickup surface having a two-dimensional planar shape and placed at an opposite position to the semitransparent mirror and being parallel to the first and third axes and being perpendicular to the second axis, for receiving the reflected light beam from the semitransparent mirror by the image pickup surface and generating two-dimensional image data of the reflected light beam; and analyzing means for:

receiving the two-dimensional image data generated by the first and second imaging means;

calculating light receiving positions in the image pickup surfaces of the first and second imaging means on the basis of the received two-dimensional image data;

estimating a light receiving position in the image pickup surface of the second imaging means where the light beam reflected by the semitransparent mirror is to be received by the image pickup surface of the second imaging means in the case where it is assumed that the axis of the main spindle coincides with the first axis, on the basis of the calculated light receiving position in the image pickup surface of the first imaging means; and comparing the estimated light receiving position with the calculated light receiving position in the image pickup surface of the second imaging means and analyzing perpendicularity of the axis of the main spindle with respect to a plane defined by the second and third axes.

2. An accuracy analyzing apparatus for a machine tool according to claim 1, wherein the apparatus further comprises data storing means for, as a data table, storing positional relationships in the case where it is assumed that the axis of the main spindle coincides with the first axis, between: the light receiving position where the light beam which is emitted from the light projecting means and transmitted through the semitransparent mirror is received by the image pickup surface of the first imaging means; and the light receiving position where the light beam which is emitted from the light projecting means and reflected by the semitransparent mirror is received by the image pickup surface of the second imaging means, and the analyzing means searches data stored in the data storing means on the basis of the calculated light receiving position in the first imaging means, reads out the light receiving position of the second imaging means corresponding to the calculated light receiving position, and sets the read out light receiving position of the second imaging means, as the estimated light receiving position of the second imaging means.

3. An accuracy analyzing apparatus for a machine tool according to claim 1, wherein the analyzing means calculates the estimated light receiving position in the second imaging means, on the basis of: the calculated light receiving position in the first imaging means; and a calculation expression which is set from relative positional relationships among the first imaging means, the second imaging means, and the semitransparent mirror, and an inclination angle of the semitransparent mirror.

4. An accuracy analyzing apparatus for a machine tool according to claim 1, wherein the analyzing means calculates a difference between the estimated light receiving position and the calculated light receiving position, compares the calculated difference with a preset reference value, and, if the calculated difference is larger than the reference value, determines that the perpendicularity is not satisfactory.

5. An accuracy analyzing apparatus for a machine tool according to claim 1, wherein the light projecting means is a laser oscillator which emits laser beam.

6. An accuracy analyzing apparatus for a machine tool according to claim 1, wherein each of the first imaging means and the second imaging means comprises a plurality of photoelectric conversion elements which are two-dimensionally arranged.

7. An accuracy analyzing apparatus for a machine tool according to any one of claims 1 to 6, wherein the apparatus further comprises a transferring device which moves the first imaging means, the second imaging means, and the semitransparent mirror between a light receiving position where the light beam emitted from the light projecting means is received, and a stand-by position separated from the light receiving position.

* * * * *